UNITED STATES PATENT OFFICE 2,304,687

PROCESS FOR THE PRODUCTION OF POLYMERIC COMPOUNDS

Max Hagedorn, Dessau, Germany, vested in the Alien Property Custodian

No Drawing. Application March 12, 1940, Serial No. 323,511. In Germany February 3, 1939

4 Claims. (Cl. 260—78)

This invention relates to the production of polymeric compounds. The polymerization or condensation of amino carboxylic acids, the carbon chain of which contains at least 5 members between the —NH— and —CO— group, also of mixtures of diamines and dicarboxylic acids of similar constitution, finally of suitable derivatives of all these compounds gives rise to the so called superpolyamides. They are high polymers showing a certain structural similarity to the proteins and polypeptides and are capable of being spun into films, filaments and the like. They are shaped, preferably at higher temperatures, right from the melt, as their solubility is confined to solvents being technically most inconvenient like formic acid, phenol, tetrachlorethane. Also their limited swelling properties or complete insolubility in water is for many purposes very troublesome.

According to this invention it has been found that hydrophile high polymers of better solubility are obtained, if the amino carboxylic acids mentioned above are condensed with tri-, tetra- and polycarboxylic acids, generally speaking with carboxylic acids containing at least 3 carboxyl groups.

It is therefore an object of this invention to provide a process of producing polymers of amino carboxylic acids with polycarboxylic acids.

A further object is the provision of a process by which polymers can be obtained, which are capable of being worked up into coatings, intermediate layers for photographic purposes, admixtures to the support and the light sensitive gelatin emulsion, plasticizers and the like.

Still other objects will become apparent from the detailed specification following hereinafter.

Such condensation products are soluble in solvents like methanol, methylenechloride and show a definite tendency to swell in water and are soluble in water as neutral or acid alkali salts.

The condensation is brought about in various manners, for example by melting the components together. The reaction is also feasible in solvents in the heat. Preferably there are added catalysts. Here there come into question the following compounds, for instance acids, hydrohalides of amines or amino carboxylic acids. In melting together it is useful to add an indifferent diluent like paraffin or to work in the presence of a plasticizer like long-chained substituted acid amides or ureas. The latter can be left completely or partly in the reaction product. The condensation takes place best at temperatures of 170–230° C. As carboxylic acids containing at least 3 carboxyl groups there come into question for instance tricarballylic acid, aconitic acid, butane tetra carboxylic acid and the like. Also higher molecular polycarboxylic acids like the addition product of colophony (abietic acid) and maleic acid anhydride may be employed. Apart from the ω-amino carboxylic acids used for condensation, also their equivalent amide-forming derivatives, capable of being condensed, like anhydrides, lactams, acid chlorides, acid amides, esters may be employed. The ω-amino carboxylic acids in question and their amide-forming derivatives are described by the general formula

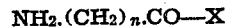

$NH_2.(CH_2)_n.CO—X$ $n$ denotes a whole number, X denotes OH, O-alkyl, O—$NH_4$ or a radical which replaces the OH group, for example an amino group which perhaps derives from the molecule itself (lactam).

The condensation products obtained according to this invention may be used for similar purposes like the cellulose glycolic acid or like the mixed esters of cellulose and dicarboxylic acids, for instance in the printing arts, for the textile industry and pharmaceutical purposes, as plasticizers for the hydrophile colloids or as auxiliary material for photographic films, for example in the form of coatings, intermediate layers or admixtures to the support of the light sensitive gelatin emulsion.

Example I 96 grams ε-aminocaprolactam are heated 20 hours at 220–230° C. in an atmosphere of carbon dioxide with 24 grams butane tetracarboxylic acid. The polymer being of feebly yellowish color and fairly hard at room-temperature has an acid number of 105–110 and is cloudly soluble in a mixture of methylenechloride-methanol 1:1. It may be purified by boiling with acetone. It is soluble in methanolic and aqueous caustic potash solution. After evaporation of the solvent there is formed a coherent, but brittle film from the solution of the potassium salt. As a neutral or acid salt it may serve as coating for photographic films, for instance to avoid electrostatic discharges.

Example II

If according to Example I 70 grams ε-aminocaprolactam are condensed with 30 grams butane tetracarboxylic acid, a high polymeric reaction product results; clearly soluble in hot methanol after purification with acetone. After evaporation of the hot methanolic solution a brittle film is obtained which is water sensitive, but loses its brittleness after saturation with water, and by adding glycerol. In a milld alkali, for instance in diluted sodium carbonate solution, the film dissolves clearly. The free acid is suitable for instance for coating pharmaceutical preparations, which, when received into the digestive system, shall be effective only in the intestines, after having passed through the stomach.

Example III

One part butane tetracarboxylic acid and 4 parts $\epsilon$-amino-caproic acid are polymerized 20 hours at 200° C. in an atmosphere of pure $CO_2$ in a glass tube sealed with quicksilver allowing an excess pressure of 50 mm. Hg. The reaction product is a feebly yellow melt soluble in methanol and formic acid. The film obtained from the solution is transparent and sticky. If there is added a catalyst, for instance $\epsilon$-aminocaproic acid hydrochloride to the reaction mixture according to Example I, a melt of gray-brown color results after 20 hours polymerization at 200° C. yielding a highly sticky film.

What I claim is:

1. A process of producing resinous high polymeric compounds soluble in hot methanol which comprises heating under polymerizing conditions a mixture of ingredients consisting essentially of an aliphatic polycarboxylic acid containing at least 3 carboxyl groups and a reactant selected from the group consisting of aliphatic primary omega monoaminomonocarboxylic acids containing at least 5 carbon atoms between the amino and carboxyl group and amide-forming derivatives of said amino acids, each of said reactants being present in substantial amount in said mixture.

2. A highly polymerized product soluble in hot methanol which consists essentially of the reaction product of a mixture of ingredients consisting essentially of an aliphatic polycarboxylic acid containing at least 3 carboxyl groups and a reactant selected from the group consisting of aliphatic primary omega monoaminomonocarboxylic acids containing at least 5 carbon atoms between the amino and carboxyl group and amide-forming derivatives of said amino acids, each of said reactants being present in substantial amount in said mixture.

3. A process for obtaining a highly polymerized product soluble in hot methanol which comprises heating under polymerizing conditions a mixture of ingredients consisting essentially of butane tetracarboxylic acid and a reactant selected from the group consisting of aliphatic primary omega monoaminomonocarboxylic acids containing at least 5 carbon atoms between the amino and carboxyl group and amide-forming derivatives of said amino acids, each of said reactants being present in substantial amount in said mixture.

4. A highly polymerized product soluble in hot methanol which consists essentially of the reaction product of a mixture of ingredients consisting essentially of butane tetracarboxylic acid and a reactant selected from the group consisting of aliphatic primary omega monoaminomonocarboxylic acids containing at least 5 carbon atoms between the amino and carboxyl group and amide-forming derivatives of said amino acids, each of said reactants being present in substantial amount in said mixture.

MAX HAGEDORN.